United States Patent [19]
Schneeberger

[11] 3,895,232
[45] July 15, 1975

[54] X-RAY CONTRAST DETECTION SYSTEM

[75] Inventor: Robert J. Schneeberger, Pittsburgh, Pa.

[73] Assignee: Westinghouse Electric Corporation, Pittsburgh, Pa.

[22] Filed: Dec. 13, 1973

[21] Appl. No.: 424,531

[52] U.S. Cl. ............................. 250/366; 250/369
[51] Int. Cl. ............................................. G01t 1/20
[58] Field of Search .......... 250/460, 483, 363, 366, 250/367, 369

[56] References Cited
UNITED STATES PATENTS

| | | | |
|---|---|---|---|
| 2,879,398 | 3/1959 | Garrison | 250/366 |
| 3,011,057 | 11/1961 | Anger | 250/366 |
| 3,327,116 | 6/1967 | Loveday | 250/366 |
| 3,723,735 | 3/1973 | Spelha | 250/366 |
| 3,808,444 | 4/1974 | Schneeberger | 250/367 |
| 3,825,758 | 7/1974 | Miraldi | 250/366 |

Primary Examiner—Harold A. Dixon
Attorney, Agent, or Firm—M. P. Lynch

[57] ABSTRACT

A radiation detection device including a scintillation crystal in the form of a rod having photomultiplier devices affixed to either end which monitors the X-ray transmission characteristics of an object. Associated circuitry responds to the output signals developed by the photomultiplier tubes to map the transmission characteristics of the object. The use of a single rod-like scintillation crystal in combination with a pair of photomultiplier devices replaces the array of discrete simulator scintillation crystals typically employed to monitor objects for radiation emitting materials.

3 Claims, 3 Drawing Figures

PATENTED JUL 15 1975

3,895,232

SHEET 1

X-RAY CONTRAST DETECTION SYSTEM

BACKGROUND OF THE INVENTION

There is described in detail in the copending patent application Ser. No. 321,403, entitled X-RAY CONTRAST DETECTION SYSTEM, filed Jan. 5, 1973, now a U.S. Pat. No. 3808444 a detection system utilizing a vertical array of discrete scintillators for monitoring the transmission characteristics of an object to determine the location of a predetermined class of devices or materials within the object. The system in the above-identified application provides desirable simultaneous radiation emitting information from a plurality of portions of the object corresponding to a plurality of scintillation crystal-photomultiplier combinations. The cost of the plurality of scintillator crystal-photomultiplier combinations required to monitor a relatively large object i.e., carry on luggage, makes the system prohibitive.

SUMMARY OF THE INVENTION

There is described herein with reference to the accompanying drawings a detector system equivalent in X-ray flux utilization and spatial resolution to the linear ray of discrete radiation detectors defined in the above identified copending application but consisting of a single rod-like scintillation crystal having a photomultiplier device positioned at either end. The single rod-like scintillation crystal having a length corresponding to the length of the array of detectors of the above-identified application in combination with the pair of photomultiplier devices provides a direct and equivalent substitute for the array of devices described in the copending application. The capability of providing accurate identification the radiation transmission characteristics of a portion of an object viewed by the single rod-like scintillation crystal is provided by associated circuitry. The presence of impinging radiation on the scintillation crystal results in an output signal from each of the photomultiplier devices positioned at either end. The point at which the radiation strikes the scintillation crystal will determine the relative magnitude of the output signals developed by the respective photomultiplier devices. Circuitry evaluating the ratio of the output signals developed by the photomultiplier devices provides and indication as to the specific location at which radiation impinges on the scintillation crystal thus identifying the location in the object transmitting the radiation.

DESCRIPTION OF THE DRAWINGS

The invention will become more readily apparent from the following exemplary description in connection with the accompanying drawing.

DESCRIPTION OF THE PREFERRED EMBODIMENT

Figure 1:
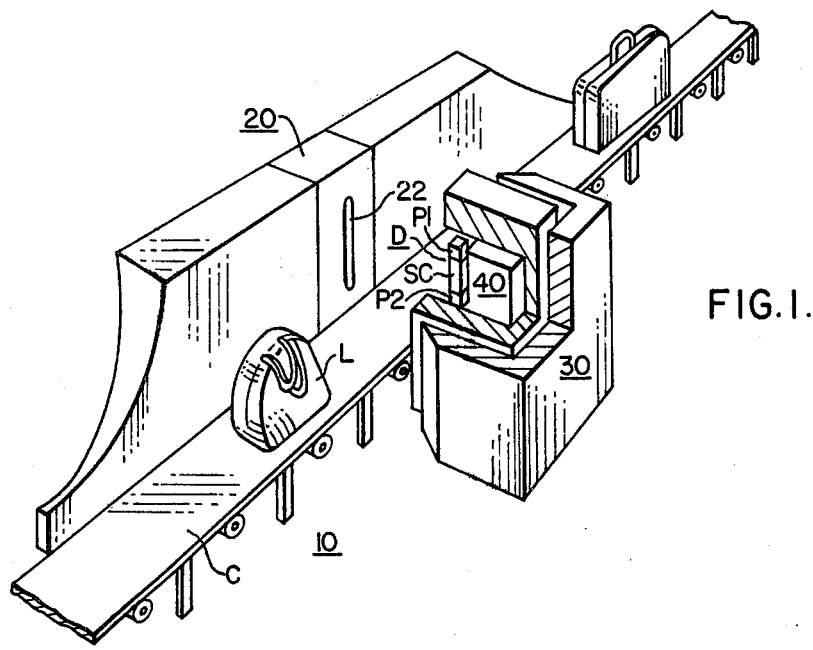
FIG. 1 is a pictorial representation of an embodiment of a radiation detection system for screening packages and luggage for the presence of a predetermined class of devices or material.

There is illustrated in FIG. 1 a pictorial representation of an object monitoring station 10 wherein a conveyer system C passes objects such as luggage L between an X-ray radiation source 20 in a radiation detection system 30. An elongated vertical aperture 22 in the radiation source 20 subjects the object L, when positioned between the radiation source 20 and the radiation detection system 30, to a beam of X-ray energy corresponding to the configuration of the aperture 22. Radiation detection system 30 includes a detector D comprised of a vertically positioned rod-like scintillation crystal C and a pair of photomultiplier devices P1 and P2 affixed to either end of the scintillation crystal SC. The detector D is positioned to monitor the X-ray transmission characteristics of the object L corresponding to that portion of the object L viewed by the detector as the object L is moved past the radiation detection system 30. The output signals produced by the photomultiplier devices P1 and P2 in response to the X-ray radiation following transmission impinging on the scintillation crystal SC following transmission by the object L are supplied to signal processing circuit 40. The signal processing circuit 40 analyzes the output signals of the photomultiplier devices P1 and P2 to characterize the X-ray transmission characteristic of the object L in order to determined the presence of predetermined classes of devices and materials within the object L, i.e., weapons, ammunition, etc.

The radiation source 20 as described in detail in the above-referenced copending application is designed to generate a collimated beam of radiation having a vertical dimension greater than the anticipated maximum vertical height of the object to be monitored. The rod-like scintillation crystal SC is vertically positioned in alignment with the collimated beam and has a vertical dimension sufficient to respond to the radiation energy transmitted by the object L. Suitable scintillation crystals for converting the X-ray radiation into light energy for response by the photomultiplier device include conventional sodium iodide and cesium iodide scintillation crystals. The scintillation crystal SC preferably exhibits the characteristics of high density, high atomic number, high photon yield and high light transparency. The high density characteristic assures detection of substantial gamma rays while the high atomic number produces a high probability of interaction between the scintillation crystal and gamma rays. The high photon yield capabilities as well as the light transparency characteristic assures generation and transmission of a significant amount of light energy from the scintillation crystal SC to the photomultiplier devices and the subsequent generation of a relatively high output signal by the photomultiplier devices P1 and P2.

The photomultiplier devices P1 and P2 affixed to either end of said scintillation crystal SC effectively amplify the light signal developed by the scintillation crystal SC response to impinging X-ray radiation. This radiation is of such intensity (activity) as to allow "pile-up" of individual pulses, thus creating a DC signal which is superimposed on an AC signal due to the random emission of the X-ray photons.

Figure 2:
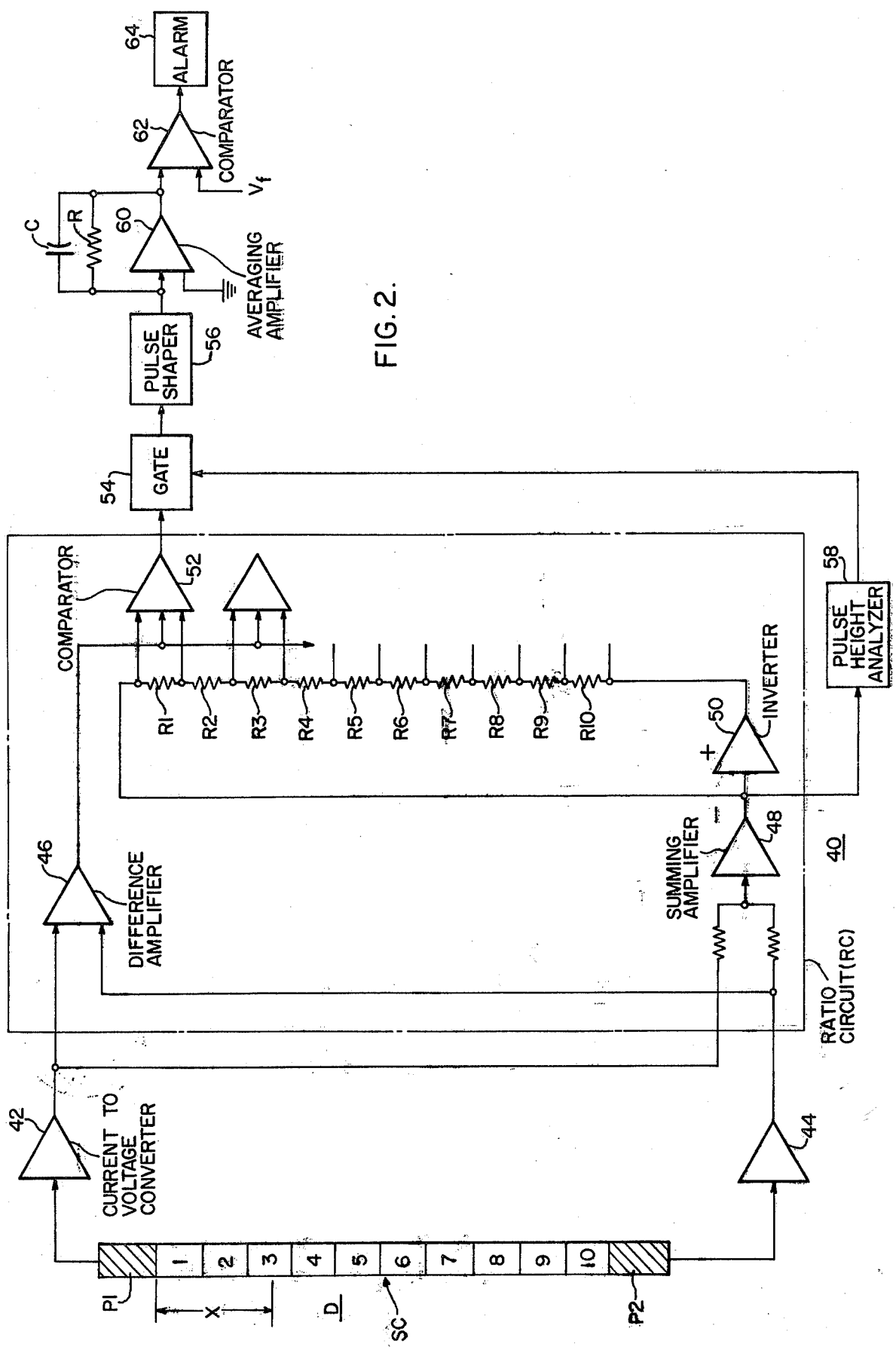
FIG. 2 is an electrical schematic illustration of the radiation detection system of FIG. 1 and corresponding signal processing circuitry.

Referring to the schematic illustration of FIG. 2 the scintillation crystal SC can be considered to be comprised of a plurality of discrete segments, herein selected to be 10, each viewing a limited portion of the object L and developing a response which is a function of the X-ray transmission characteristics of that limited portion of the object L.

Figure 3A:
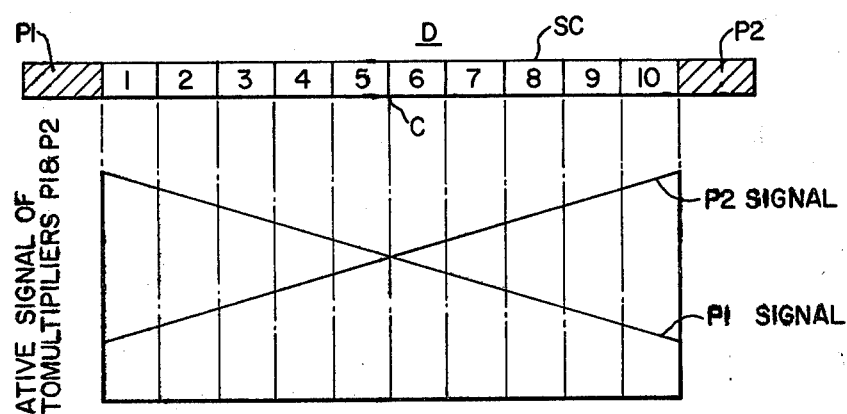
FIGS. 3A and 3B are graphical representations of the operation of the radiation detection system of FIG. 1.
Figure 3B:
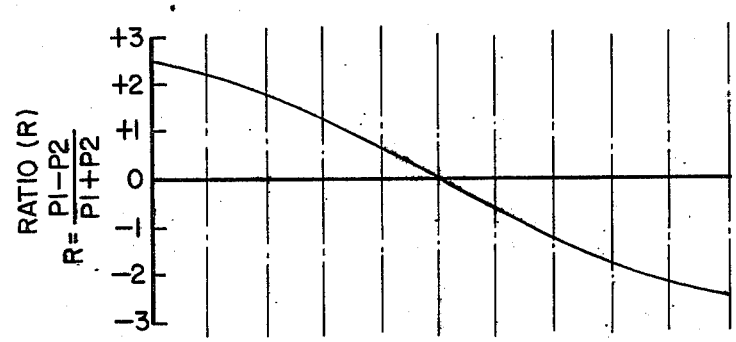

Assume for the purpose of discussion that X-ray energy impinges at a distance X from the photomultiplier device P1 which corresponds to scintillation crystal segment 3. Inasmuch as X-ray radiation impinging on the scintillation crystal SC is substantially closer to the photomultiplier device P1 than the photomultiplier device P2, the magnitude of the signal developed by the photomultiplier device P1 in response to the scintillator crystal reaction will be substantially greater than the magnitude of the output signal developed by the photomultiplier device P2. A plot of the relative magnitude of the output signal developed by the photomultiplier devices P1 and P2 in response to impinging radiation along the scintillation crystal SC is depicted in FIG. 3A. It is apparent from FIG. 3A that radiation impinging at a point on the scintillation crystal SC midway between the photomultiplier devices P1 and P2 will produce output pulses from the photomultiplier devices P1 and P2 of substantially identical magnitude. It is evident that an unambiguous relationship exists between the location at which X-ray energy impinges on the scintillation crystal and the value of a ratio of the output pulses of the photomultiplier devices. Such a ratio function as plotted in FIG. 3B is represented as:

$$R = P1 - P2/P1 + P2$$

The signal processing circuit 40 schematically illustrated in FIG. 2 illustrates one technique for processing the output pulses developed by the photomultiplier devices P1 and P2 in order to identify the scintillations generated at various locations in the scintillation crystal SC over a period of time. The period of time corresponds to the time to view an object in which the order to develop a profile of the radiation transmission characteristic of the object for the purposes of classifying material contained within the object.

In the above reference copending application a detailed description was presented outlining the use of the system of FIGS. 1 and 2 for monitoring baggage for concealed weapons and ammunition. The X-ray transmisson characteristics of weapons and ammunition were identified relative to transmission characteristic of other objects typically found in baggage. This capability of differentiating between materials on the basis of X-ray transmission characteristics permitted implementation of signal processing circuitry capable of readily identifying weapons and ammunition concealed within an object.

It has been determined experimentally that the majority of articles found in luggage are made of material having path lengths such that the X-ray transmission ranges from moderate to almost complete in the 225-350 KeV energy range. Thus, utilization of an X-ray radiation source producing X-ray energy in a range between 200 and 400 KeV will result in significantly high output signals from the photomultiplier devices in response to scintillation occurring within the scintillation crystal SC when viewing luggage containing such typical articles. In contrast, however, a material such as lead as represented by bullets in a gun is almost completely opaque at X-ray energies between 200 and 400 KeV even for the relatively short path lengths encountered within a 0.22 caliber bullet. Since it is unlikely that a concentration of lead to the degree found in a bullet would exist in any other common object, the contrast in X-ray transmission characteristics between a bullet and conventional articles found in luggage provide a reliable basis for detecting a loaded gun.

Referring again to FIG. 2, there is illustrated a schematic representation of an embodiment of the signal processing circuit 40 for identifying the location of scintillation occurring in the scintillation crystal SC. The output signal developed by photomultiplier devices P1 and P2 in response to energy impinging on the scintillation crystal SC are supplied to current to voltage converters 42 and 44, respectively. The output signals of the current to voltage converters 42 and 44 are supplied as input signals to difference amplifier 46 and summing amplifier 48 of the ratio circuit RC. The output signal of the summing amplifier which exhibits a first polarity is supplied to one end of a series of resistors R1–R10 while also being supplied to an inverting circuit 50 which functions to develop an output signal corresponding to that of the summing circuit but of opposite polarity which is supplied to the opposite end of the series connected resistors R1–R10. The resistors R1–R10 correspond to the discrete segments 1–10 of scintillation crystal SC. The midpoint of the series connected resistors is connected to ground, this point corresponding to the midpoint of the scintillation crystal SC. There is associated with each of the series connected resistors a signal processing channel of the type schematically associated with resistor R1. Inasmuch as the signal processing channels associated with each of the remaining resistors is identical to that illustrated, the operation of the circuitry associated with resistor R1 will be identical for each of the remaining resistors. The voltage signal developed across resistor R1 and the output of the difference amplifier 46 are supplied as inputs to the comparator circuit 52. The output of the difference amplifier 46 likewise serves as an input to each of the comparator circuits of the respective signal processing channels associated with each of the other series connected resistors. The comparator circuit 52 functions to compare the output of the difference amplifier 46 with the voltage signal developed across the associated resistor. The comparator circuit associated with the resistor exhibiting a voltage drop substantially corresponding to the output of the differential amplifier 46 will produce an output signal. Inasmuch as only one signal processing channel has been schematically illustrated in FIG. 2 and that being the one corresponding to resistor R1 it will be assumed, for the purposes of discussion that the signal developed across the resistor R1 corresponds substantially to the output signal of the difference amplifier 46. This situation would occur in response to energy impinging on the discrete portion of the scintillation crystal SC identified as portion 1. The output signal developed by the comparator circuit 52 in response to the presence of a voltage signal developed across resistor R1 which is substantially equivalent to the output signal of the difference amplifier 46 is supplied to the gate circuit 54. The transmission of the output signal from the comparator circuit 52 to the gate circuit 54 to the pulse shaper circuit 56 is dependent on the presence of an output signal from a pulse type analyzer 58 which serves as a gating signal to the gate circuit 54. A pulse type analyzer circuit 58 functions to discriminate between extranesus signals unrelated to the signal of interest by requiring the signal developed by the summing amplifier 48 to satisfy a predetermined pulse height requirement. Typically a pulse height between 150 and 300 KeV would be required in a system operating to monitor for the presence of guns or ammunition. If the signal developed by the summing amplifier 48 satisfies the pulse height requirement established by the pulse height analyzer 58, the pulse height analyzer 58 transmits a gate signal to the gate circuit 54 which functions to gate the output signal from the comparator circuit 52 to the pulse shaper circuit 56. The pulse shaper circuit 56 functions to produce a uniform rectangular output pulse for application to the averaging amplifier 60. The averaging amplifier 60 through the use of appropriate values for resistor R and capacitor C in a feedback circuit is designed with a bandwidth to respond to discrete input pulses occurring over a predetermined period of time such as that corresponding to 30 hertz. The averaging amplifier thus develops an output signal corresponding to the discrete input pulses received during the predetermined time interval. This composite signal is subsequently supplied to comparator circuit 62 which compares the composite signal to a predetermined reference signal $V_f$ which corresponds to a material or object of interest, i.e., a gun. If the composite signal developed by the averaging amplifier 60 satisfies the reference signal $V_f$ the comparator circuit 62 transmits actuating signal to the alarm circuit 64.

The schematic illustration of FIG. 2 is merely illustrative of one way of utilizing the information developed by the detector D. It is apparent that the detailed circuitry illustrated in FIG. 2 could be modified to provide a cathode ray tube profile of the material content of an object used by the detector D. It is further apparent that the embodiment illustrated in FIG. 2 can be further simplified to the use of multiplexing circuit at the output of the averaging amplifiers of the signal processing channels thus requiring but a single comparator circuit and alarm circuit.

I claim:

1. A baggage and parcel inspection apparatus comprising, an elongated scintillation crystal adapted to respond to radiation energy emanating from baggage or parcels exposed to a source of radiation, the length of said scintillation crystal being sufficient to view the vertical dimension of said baggage or parcels, a first photoresponsive device having a viewing surface optically coupled to an end surface of said elongated scintillation crystal and a second photoresponsive device having a viewing surface optically coupled to the opposite end surface of said elongated scintillation crystal, said viewing surfaces being substantially perpendicular to the longitudinal axes of said elongated scintillation crystal, said first and second photoresponsive devices producing output signals in response to radiation impinging on said elongated scintillation crystal, a radiation source spaced apart from said elongated scintillation crystal to expose baggage and parcels positioned therebetween to radiation energy, and circuit means connected to said first and second photoresponsive devices to monitor the signals developed by said photoresponsive devices in response to radiation transmitted by said baggage and parcels and impinging on said elongated scintillation crystal.

2. Radiation responsive apparatus as claimed in claim 1 further including circuit means operatively connected to said first and second photoresponsive devices for analyzing the output signals from said photosensitive devices to identify the location of impinging radiation on said elongated scintillation crystal, scintillations occurring at the midpoint of the elongated scintillation crystal producing output signals from said first and second photosensitive devices of essentially the same magnitude.

3. Radiation responsive apparatus as claimed in claim 1 further including circuit means for analyzing the output signals of said first and second photosensitive devices to determine if the radiation emanating from the object and impinging on said scintillation crystal is indicative of predetermined radiation transmission characteristic.

\* \* \* \* \*